INVENTOR.
HENRI L. GAUDRIOT
ELMER C. HARTMAN
BY

ATTORNEYS 3,173,556
METHOD AND APPARATUS FOR STORING
BAR STOCK ARTICLES
Henri L. Gaudriot, 1 Highland Heights, Rochester, N.Y., and Elmer C. Hartman, 199 S. Main St., Fairport, N.Y.
Filed May 17, 1960, Ser. No. 29,732
2 Claims. (Cl. 214—8)

This invention relates to a method and apparatus for storing articles and more particularly for the temporary storage of bar stock to be machined, or otherwise processed by manufacturers.

For a number of years sized bar stock has most commonly been stored in racks composed of vertical and horizontal members welded or bolted together to form a rigid frame having a number of horizontally extending racks or "pigeonholes." Different sized bar stock was stored in these pigeonholes. This provided a very awkward and very permanent arrangement. The main problems of this type of permanent fixture, commonly referred to as a pigeonhole rack, has been its utter lack of adaptation to varying requirements. Such permanent storage facilities result in a substantial loss of floor space to manufacturers because such apparatus is neither readily movable nor may it be readily disassembled. When it is partially or totally empty, that portion of the space not used for storage is a complete waste to the manufacturer using this type of storage facilities.

This undesirable type of storage arrangement gave rise to a storage system composed of a plurality of horizontally extending "cradles" which are in length the same as the stock to be stored therein. These cradles are adapted to be stacked one on top of the other. The distinct disadvantage of this particular storage system is the fact that when bar stock is not being stored in the cradles, the cradles take up as much space as when utilized for storage purposes.

One object of the present invention, generally stated, is to provide a method and apparatus for overcoming the above stated disadvantages of prior bar stock storage methods and apparatus.

Another object of our invention is to provide a method and apparatus which are more efficient for the manufacturer requiring storage facilities for bar stock.

Another object of our invention is to provide an apparatus which is cheaper to manufacture.

A further object of our invention is the provision of portable storing facilities which are very simple to dismantle, and in which dismantled form, they require very limited space.

Another object of our invention is the provision of a plurality of support members adapted for lifting simultaneously and for interlocking with similar support members whereby a plurality of support members may be nested.

A further object of our invention is a method for storing bar stock in close proximity for easy mechanical unloading.

Another object of our invention is the provision of a method and apparatus for utilizing a minimum amount of floor space for storing bar stock.

A further object of our invention is the provision of apparatus which is universally adaptable to storing bar stock in any desired angle or position with respect to machines for milling the bar stock.

Other objects and advantages of this invention will be particularly set forth in the claims and will be apparent from the following description, when taken in connection with the accompanying drawings, in which:

Figure 1:
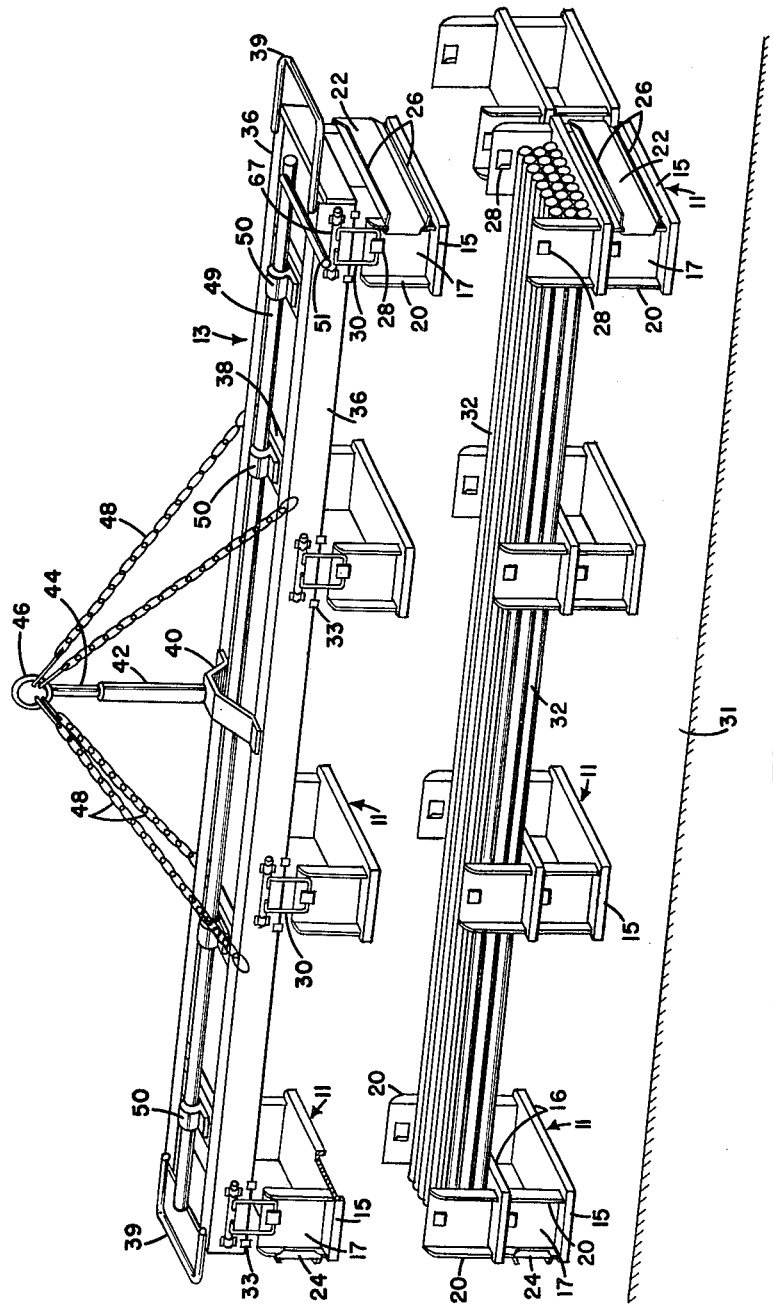
FIG. 1 represents a perspective view of one embodiment of our invention including a plurality of support members nested on top of a plurality of support members and supporting bar stock. Also included is a third plurality of support members being supported by a lift adapted for transporting a plurality of support members loaded with bar stock.

Referring to FIG. 1, the illustrated embodiment of our invention includes a plurality of stock supports or support members, each of which is generally indicated by the numeral 11. The combination of the plurality of supports 11 constitute a "rack" for supporting bar stock 32. Each support is adapted to be lifted by a power controlled lift frame, generally indicated by the numeral 13. The lift frame 13 is preferably raised and lowered by an electric trolley (not shown) mounted on tracks (not shown) for universal raising, lowering and positioning of the lift frame within the range of the tracks upon which the electric trolley travels.

Each stock support preferably consists of a rigid metal base 15 having all four edges turned down to form a flange 16 extending around the entire perimeter of base 15. Two flanged side members 17 are welded to base 15 and spaced a distance equal to the width of the lift frame 13. Each side member 17 has two flanges 20 adapted for nesting with turned down flange 16 of base 15. An end gate 22, having two normally vertical flanges 24 adapted for sliding on flanges 20, provides a convenient means for aligning bar stock 32 when it is placed on a plurality of stock supports. End gate 22 has two normally horizontal flanges 26 which provide a convenient handle means enabling an operator to slide the end gate 22 off of the flanges 20. Thus, it is understood that with the flange arrangement on both the support 11 and end gate 22 makes them adaptable to perform the same function regardless of whether any given stock support is turned end for end and the end gate turned over. It is the upper flange 26 which the operator grabs when removing or replacing an end gate with respect to a stock support 11, and with the double flange arrangement, there is always an upper flange 26.

Figure 2:
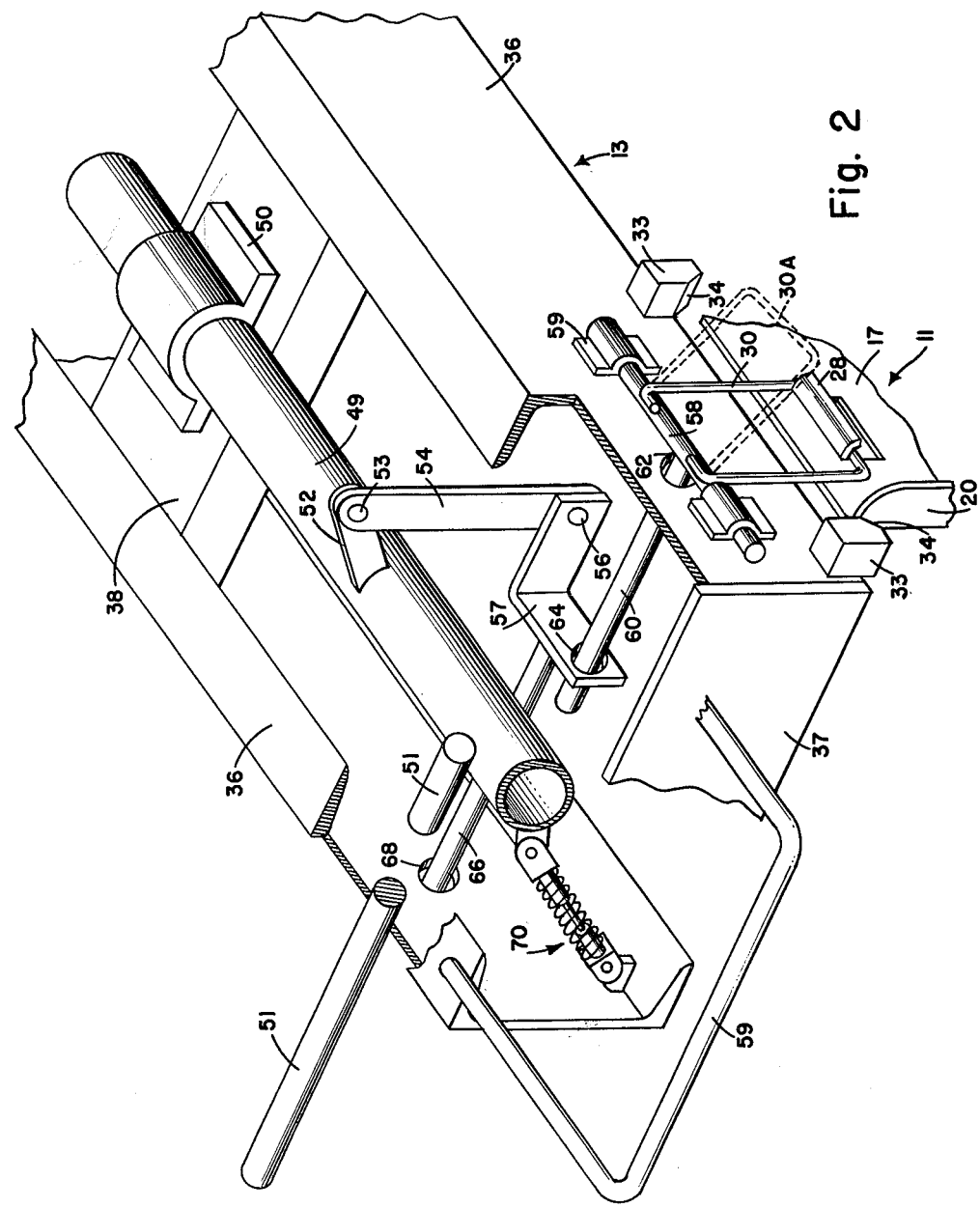
FIG. 2 is an enlarged perspective view of the right-hand end portion of the lift as shown in FIG. 1 with parts broken away and partly in section.

Each side member 17 of stock support 11 is provided with a handle or locking member 28 (see FIG. 2). Preferably, these handles are punched out of the side members 17. Each handle 28 is adapted for being engaged by a link 30 of the lift 13 as will be described in detail hereinafter.

There are many conceivable ways of properly aligning each support 11 on a floor or horizontal supporting surface 31 whereby a proper alignment of the handles 28 with the links 30 of lift frame 13 may be attained. Preferably, this alignment is accomplished by mounting four supports 11 on lift frame 13 in a manner hereinafter described and lowering the lift frame to a position where the four stock supports 11 engage the floor 31 and the flanges 20 of supports 11 are aligned between two alignment blocks 33 (FIG. 2) rigidly mounted on both sides of lift frame 13. A diagonally extending surface 34 has been provided on each block 33 to facilitate the sliding of supports 11 into the aligned position between blocks 33. Thereafter, by means hereinafter described, the lift frame disengages the four stock supports 11, leaving them in their proper respective positions. It is understood that the alignment of the first four supports 11 could be accomplished by means of pins, pegs or grooves on the floor or by practically any other known aligning means.

After the first four stock supports are aligned on the floor, a chosen quantity of bar stock 32 of selected size and shape is placed on the four stock supports between the end gates 22. Thereafter, the end gates 22 are preferably removed so that bar stock may be withdrawn from the rack created by the four supports 11. Also, the bar stock 32 may be placed on the four supports without having placed the end gates on supports 11. Once the bottom four supports 11 have been aligned and bar stock placed thereon, a second series of four supports 11 may be nested on top of the bottom four supports. This vertical nesting of supports may be repeated as many times as desired and after the bottom four supports are aligned, the nesting of supports may be accomplished without assistance of the lift frame 13.

This method and apparatus for nesting pluralities of relatively small stock supports on top of a plurality of stock supports properly aligned with respect to a lift frame provides a very convenient and universally adaptable storage system. It is understood that after the bar stock has been entirely depleted from its place of storage, the four stock supports 11 which support the bar stock may be conveniently stored in a limited or minimum amount of storage space and may be easily and very conveniently reassembled when desired for storage purposes.

The lift frame 13 includes a rectangularly shaped frame composed of two rigid metal beams 36 (see FIG. 2 for cross-section) spaced by two metal end members 37 rigidly mounted thereto and a plurality of rigid cross members 38 rigidly mounted thereto. Two handles 39, one each of which is rigidly mounted on either end of the beam 36, provide a convenient means for manual guiding of the lift frame 13. The lift frame 13 has a yoke member 40 (FIG. 1) rigidly mounted thereto which supports a female tubular member 42 rigidly mounted on yoke 40. A male tubular member 44 freely slidable within female member 42 has a ring portion 46. The upward sliding movement of male tubular member 44 is limited by four chains each of which is looped through ring portion 46 at one end and rigidly connected to beams 36 at the other end. A tubular shaft 49 is rotatably mounted in a plurality of bushings 50 rigidly mounted to cross members 38.

Referring to FIG. 2, a manually operated handle 51 is rigidly connected to tubular shaft 49 and provides a means by which the shaft 49 may be rotated. Each set of links 30 is arranged in a manner whereby they simultaneously lock with both handles 28 of a single stock support 11. The shaft 49 controls all four sets of links simultaneously by a quartet of identical linkages, each of which comprises a member 52 rigidly mounted to shaft 49 which is pivotally connected at 53 to a member 54, in turned, pivotally interconnected at 56 to an angular member 57. Each link 30 is rigidly mounted in the manner shown in FIG. 2 to a circular bar 58 pivotally seated at both ends in bushings 59 which are rigidly connected to beam 36. A pivot shaft 60 rigidly connected to the right hand bar 58 is viewed in FIG. 2, extends through a hole 62 of beam 36 and through a hole 64 of angular member 57. A pivot shaft 66 rigidly connected at its left end as viewed in FIGS. 2 and 4 to a bar 67 extends through a hole 68 (FIG. 2) of beam 36 and is rigidly connected at its other end to angular member 57.

It will be understood from this arrangement that as the handle 51 is rotated clockwise as viewed in FIG. 2, the member 52 is likewise pivoted clockwise actuating member 54 downwardly in a clockwise direction and in turn angular member 57 pivots clockwise about the center axis of bar 67. The clockwise pivoting action of angular member 57 actuates pivot shaft 60 to pivot in a counterclockwise direction about the center axis of bar 58 which is also pivoted counterclockwise. Thus, a clockwise motion of handle 51 results in a counterclockwise motion of the link 30 connected to bar 58 and a clockwise motion of the link 30 connected to bar 67. In FIG. 2, the link 30 is shown in a locked position with respect to the handle 28 and the link 30A shown in broken line depicts the link in an unlocked position with respect to handle 28. This provides a simultaneous pivoting of all the links 30 for locking or unlocking with handles 28 of stock supports 11. The "throw" of the links caused by the pivoting action just described is only sufficient to completely release each link from each handle 28 so that no links could possibly re-engage handle 28 at a time when lift frame 13 is raised from an engaging position with the stock supports 11. The limited amount of "throw" of the links 30 enables the parallel nesting of pluralities of stock supports 11 in very close proximity to each other so there is almost complete utilization of floor space.

It will be understood that our invention is adaptable for use with an automatic lift device having links that would automatically lock with handles 28 every other time that the links are actuated electrically, and alternately the links are automatically actuated to unlock with handles 28.

Figure 3:
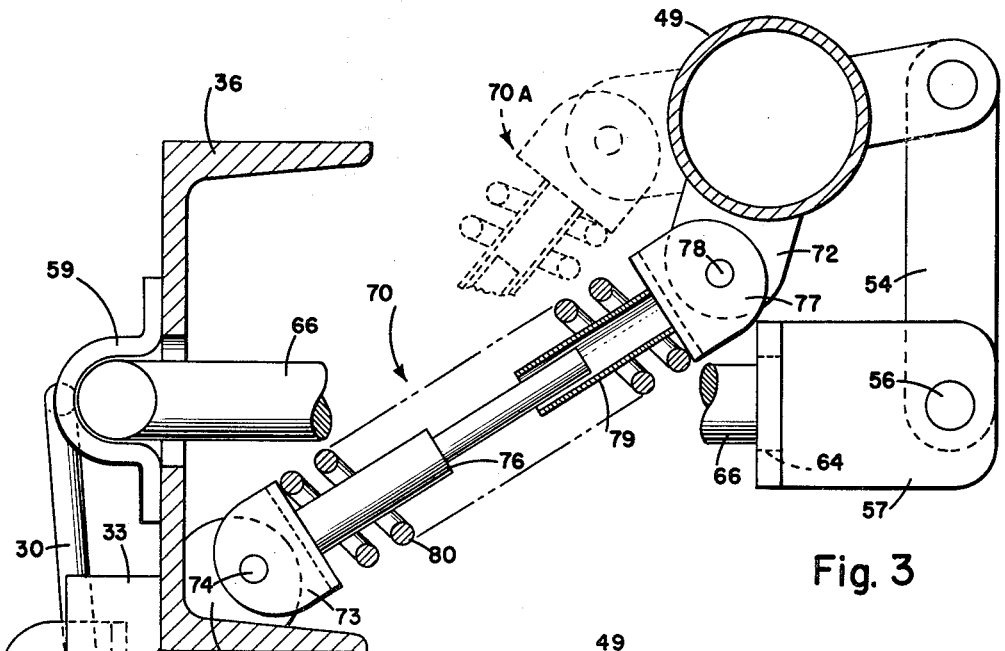
FIG. 3 is an enlarged right-hand end elevation as viewed in FIG. 1 of the lift and safety device of my invention with parts removed, parts broken away and parts in section, including a broken away portion of a support member.
Figure 4:
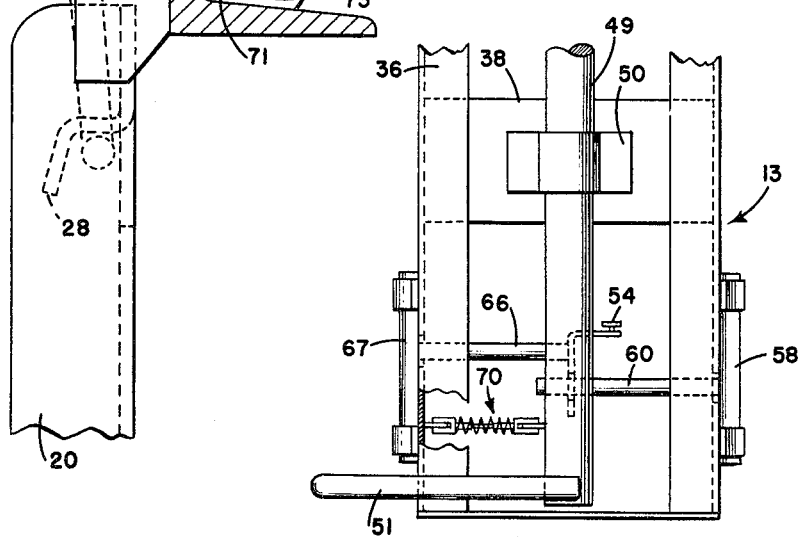
FIG. 4 is a partial top elevational view of the lift with parts broken away.

We have provided a safety device generally indicated by the numeral 70 for insuring that all links 30 will either be in a locked or unlocked position and not in an intermediate position. Referring to FIG. 3, we have shown the safety device 70 in solid lines at a position where the links 30 are in a locked position and in broken lines 70A at the position when the links would be in an unlocked position such as 30A (FIG. 2). As shown in FIG. 4, this is accomplished with a spring detent device operatively effective between a member 71 rigidly connected to beam 36 and a member 72 rigidly connected to shaft 49. A yoke 73 pivotally mounted at 74 to member 71 supports a male stud 76 rigidly mounted on yoke 73. A yoke 77 pivotally mounted at 78 to member 72 supports a female tubular member 79 rigidly mounted on yoke 77. A compression spring 80 frictionally engages yoke 73 and yoke 77 and is aligned by female tubular member 79 and male stud 76 slidable therein. When the manually operated handle 51 is pivoted clockwise with respect to FIG. 3, the spring 80 is compressed by the clockwise movement of member 72 bearing against the yoke 77 at the pivotal point 78 until the pivotal point 78 crosses an imaginary axis extending from the pivotal point 74 to the center of tubular shaft 49; after the safety spring detent device is pivoted clockwise beyond that imaginary axis, the compression on the spring 80 diminishes until it reaches the position shown in broken lines and designated as 70A. At 70A, the compression is the same as that shown in position 70. It is understood that the spring 80 is under sufficient compression to force the shaft 49 to pivot to either of the above described two positions. Therefore, my invention contemplates the inclusion of a safety device which maintains the links 30 in an open or closed position at all times to prevent links 30 accidentally engaging handles 28.

In operation, end gates 22 are placed on the two end stock supports 11 of the top four nested supports. The end gates prevents bar stock 32 from sliding off either end of the rack, formed by the four stock supports, while the supports are in motion. The operator makes sure that the links 30 are in an unlocked position. Then, the operator with the aid of handles 39 guides the lift frame 13 into an engaging position with the bushings 59 (see FIG. 9) of the top four nested supports 11. The alignment blocks 33 serve to guide the lift frame 13 into proper alignment with the four supports 11. When the lift frame is in an engaging position with the bushings 59, there is sufficient clearance between links 30 and handles 28 for the links 30 to be pivoted to an unlocked position. The operator manually pivots the handle 51 in a clockwise direction as viewed in FIG. 1 in order to lock the links 30 with the handles 28. Thereafter, the lift 13 is raised upwardly to the position portrayed in FIG. 1. The operator manually controls the positioning of the rack formed by the four supports 11, so that when the lift frame is lowered, the lift 13 is directly over the desired place of relocation of the four supports 11 and the bar stock supported thereby. After the relocation of the rack and bar stock, the operator manually turns the handle 51 until the links 30 are in an unlocked position with respect to the handles 28. The lift 13 is then free to be raised without danger of engaging any of the handles 28. Thereafter, the operator removes the end gates 22 and the bar stock 32 is ready for removal.

It will be understood that our invention contemplates any simple modification whereby two or more of the series of four supports nested one on top of the other could be locked together, so that when the lift frame 13 is performing the lifting or raising function described above, a plurality of racks full of bar stock may be lifted at one time.

While we have shown and described the preferred form of mechanism of our invention it will be apparent that various modifications and changes may be made therein, particularly in the form and relation of parts, without departing from the spirit of our invention as set forth in the appended claims.

We claim:

1. Apparatus for storing and transporting bar stock comprising, in combination, a plurality of disconnected horizontally spaced telescoping stock supports adapted for vertical stacking, two of said stock supports are end supports positioned at substantially opposite ends of said bar stock, end gates mounted on opposite sides of said end supports, means for lifting said stock supports when loaded with bar stock, and locking means intermediate said lift means and each of said stock supports for simultaneously lifting said disconnected stock supports.

2. A method of storing and transporting bar stock comprising the following steps: selectively horizontally spacing a plurality of disconnected stock supports adapted for vertical telescopic stacking, spacing two of said supports to support opposite exposed ends of said bar stock, supporting bar stock on said supports, closing oppositely disposed ends of said supports and simultaneously lifting said disconnected supports while maintaining said selected spacing to transport the same.

References Cited in the file of this patent

UNITED STATES PATENTS

| | | |
|---|---|---|
| 476,353 | Allred | June 7, 1892 |
| 561,714 | Lynch | June 9, 1896 |
| 1,029,139 | Moltrup | June 11, 1912 |
| 1,750,878 | Coe | Mar. 18, 1930 |
| 1,927,004 | Frazer | Sept. 12, 1933 |
| 2,030,863 | Fitch | Feb. 18, 1936 |
| 2,429,193 | Pool | Oct. 14, 1937 |
| 2,591,049 | Butsch | Apr. 1, 1952 |
| 2,603,523 | Cameron | July 15, 1952 |
| 2,665,937 | Reigh | Jan. 12, 1954 |
| 2,771,211 | Schrader | Nov. 20, 1956 |
| 2,905,501 | Jakubowski | Sept. 22, 1959 |
| 2,916,153 | Saul | Dec. 8, 1959 |
| 2,924,484 | Tolsma | Feb. 9, 1960 |
| 2,941,771 | Sim | June 21, 1960 |

FOREIGN PATENTS

| | | |
|---|---|---|
| 120,905 | Russia | Mar. 7, 1959 |